United States Patent
Chen et al.

(10) Patent No.: US 9,332,269 B2
(45) Date of Patent: May 3, 2016

(54) SLICE OVERHEAD CODING

(71) Applicant: Broadcom Corporation, Irvine, CA (US)

(72) Inventors: Peisong Chen, San Diego, CA (US); Wade Wan, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 638 days.

(21) Appl. No.: 13/648,187

(22) Filed: Oct. 9, 2012

(65) Prior Publication Data

US 2014/0003503 A1 Jan. 2, 2014

Related U.S. Application Data

(60) Provisional application No. 61/665,216, filed on Jun. 27, 2012.

(51) Int. Cl.
*H04N 19/463* (2014.01)
*H04N 19/70* (2014.01)

(52) U.S. Cl.
CPC ............ *H04N 19/463* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 2006/0197777 A1* | 9/2006 | Cha | ........................ | H04N 19/34 345/600 |
| 2010/0189181 A1* | 7/2010 | Zheng | .................... | H04N 19/70 375/240.24 |
| 2013/0194384 A1* | 8/2013 | Hannuksela | ........... | H04N 19/70 348/43 |
| 2013/0343465 A1* | 12/2013 | Chen | .................... | H04N 19/597 375/240.24 |

OTHER PUBLICATIONS

Heiko Schwarz, Detlev Marpe, Member, IEEE, and Thomas Wiegan, Member, IEEE "Overview of the Scalable Video Coding Extension of the H.264/AVC Standard" IEEE Transactions on Circuits and Systems for Video Technology, vol. 17, No. 9, Sep. 2007.*
Bross, et al., "High Efficiency Video Coding (HEVC) Text Specification Draft 7", JCTVC-I1003, 9th Meeting, Apr. 27, 2012-May 7, 2012.

* cited by examiner

*Primary Examiner* — David Harvey
*Assistant Examiner* — Stuart Bennett
(74) *Attorney, Agent, or Firm* — McDermott Will & Emery LLP (57) ABSTRACT

An example video coding system may include a processor and memory. The processor may determine sets of parameters for slices that correspond to a picture of a video sequence, and determine, and store in overhead information, the set of parameters that has the highest commonality. The processor may determine for each slice whether the set of parameters determined for the slice is equivalent to the set of parameters stored in overhead information. If the set of parameters for the slice is equivalent to the set of parameters stored in overhead information, the processor may store an indication in a slice header of the slice that indicates that the set of parameters stored in overhead information applies to the slice, otherwise the processor may store in the slice header of the slice the determined set of parameters for the slice. The processor may transmit the overhead information and the slices.

20 Claims, 7 Drawing Sheets

SLICE OVERHEAD CODING

CROSS-REFERENCE TO RELATED APPLICATIONS

The present application claims the benefit of priority under 35 U.S.C. §119 from U.S. Provisional Patent Application Ser. No. 61/665,216 entitled "Video Coding System," filed on Jun. 27, 2012, the disclosure of which is hereby incorporated by reference in its entirety for all purposes.

TECHNICAL FIELD

The present description relates generally to a coding system, and more particularly, but not exclusively, to a video coding system.

BACKGROUND

In some video coding systems, such as coding systems implementing the International Telecommunication Union Telecommunication Standardization Sector (ITU-T) H.264 Standard, the International Organization for Standardization (ISO)/International Electrotechnical Commission (IEC) 14496-10-MPEG-4 Part 10, Advanced Video Coding Standard, or the Joint Collaborative Team on Video Coding (JCT-VC) High Efficiency Video Coding (HEVC) specification, a video coding layer (VCL) includes the video processing functionality of the codec, while a network abstraction layer (NAL) encapsulates the output of the VCL encoder for network transmission.

The video coding layer may include an encoder that generates a coded video sequence that includes a sequence of coded pictures. A coded picture of the sequence may be a collection of one or more slices. For example, the VCL encoder may be a macroblock-based coder that utilizes inter-picture prediction with motion compensation, and transform coding of the residual signal. The VCL encoder may output one or more slices that include a sequence of macroblocks of a picture along with a header that contains information, e.g. overhead information, related to the slice, such as the spatial address of the first macroblock in the slice, the initial quantization parameter, etc. The VCL encoder may also generate parameter sets that contain information pertaining to one or more slices or pictures, such as sequence parameter sets or picture parameter sets. The parameter sets may generally contain information that may be applicable to multiple slices or pictures. The parameter sets may include an identifier that may be used by the one or more slices and/or pictures to reference the parameter sets.

The network abstraction layer may include an encoder that encapsulates the slices into Network Abstraction Layer Units (NAL units), that may be transmitted over a network, such as over a packet network. A NAL unit may include a header, separate from the headers of the slices. Thus, the NAL unit may include overhead information in the form of the NAL header in addition to the headers of the slices.

BRIEF DESCRIPTION OF THE DRAWINGS

Certain features of the subject technology are set forth in the appended claims. However, for purpose of explanation, one or more implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
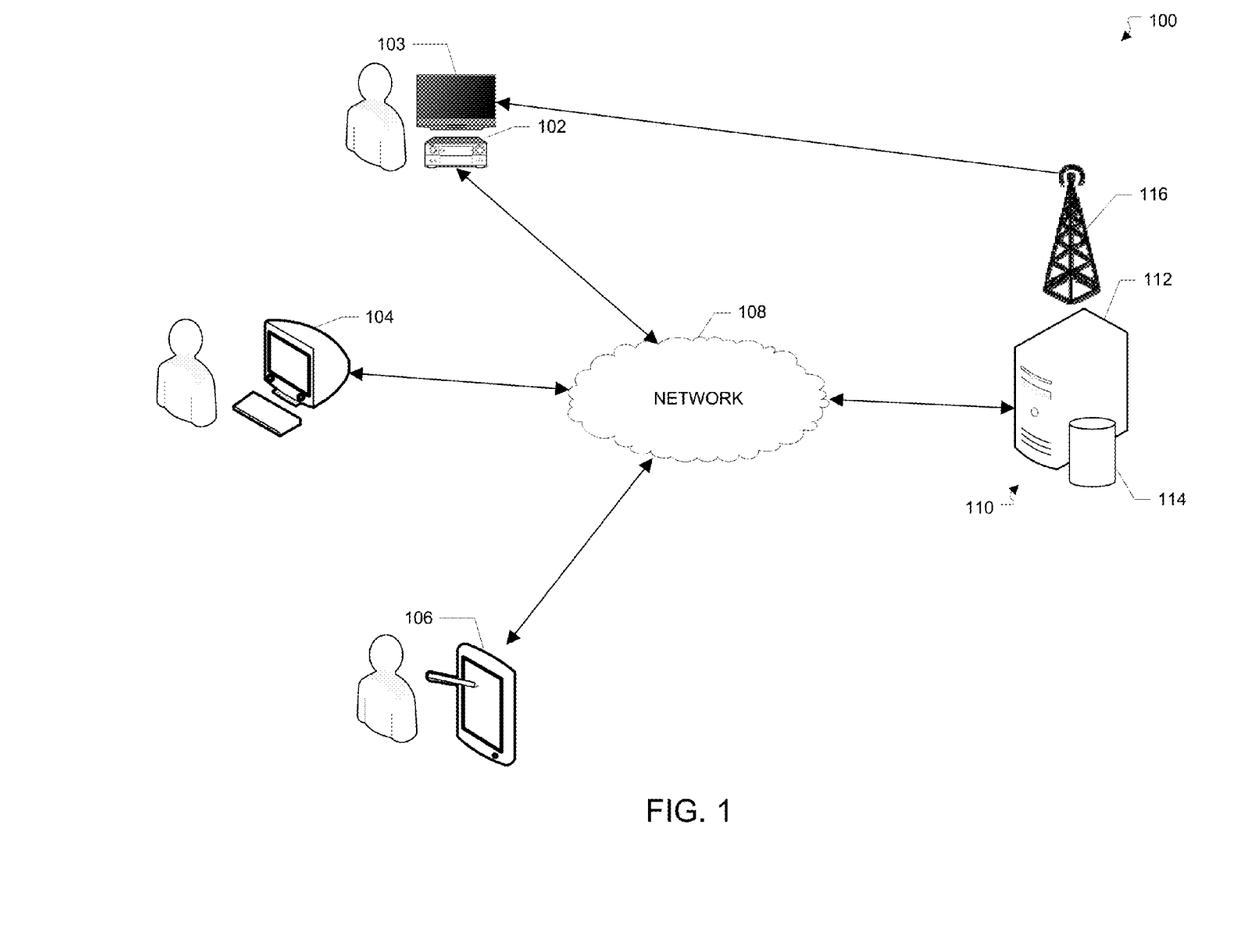
FIG. 1 illustrates an example network environment in which a video coding system may be implemented in accordance with one or more implementations.

FIG. 1 illustrates an example network environment 100 in which a video coding system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 may include a number of electronic devices 102, 104, 106 that are communicably connected to a server 110, such as by a network 108, and one or more electronic devices 103 that receive analog or digital transmissions from the server 110 through an antenna 116. In another example, the electronic devices 102, 104, 106 may be communicably connected to one another, such as by the network 108, but not communicably connected to the server 110.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. The network 108 may also include one or more satellite relays or satellite transmission systems. In one or more implementations, a data stream from the server 110 may be transmitted to a satellite and then relayed from the satellite to one or more of the electronic devices 102, 103, 104, and 106. In these one or more implementations, the electronic devices 102, 103, 104, 106, and the server 110, may include, or may be coupled to, a satellite dish or other antenna capable of receiving a transmission from a satellite.

In one or more implementations, the electronic devices 102, 104 and 106 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for receiving and/or decoding a video stream, or can be coupled to such a device. In the example of FIG. 1, the electronic device 102 is depicted as a set-top box, the electronic device 104 is depicted as a desktop computer, and the electronic device 106 is depicted as a tablet device.

In one or more implementations, the electronic device 103 can be any device capable of receiving an analog or digital transmission of a data stream, such as a transmission of a coded video stream. In one or more implementations, the electronic device 103 may be an antenna, a satellite antenna, a television that includes an antenna, or generally any device that may receive a transmission of a data stream. In the example of FIG. 1, the electronic device 103 is depicted as a television capable of receiving a digital or analog transmission, such as through an antenna. In one or more implementations, the electronic device 103 may be communicatively coupled to the electronic device 102, such that the electronic device 103 may receive audio and/or video signals from the electronic device 102.

The electronic devices 102, 103, 104, 106 may include, or may be coupled to a device that includes, a decoder, such as a video decoder. The decoder may operate in accordance with one or more video coding standards or specifications, such as the ITU-T H.264 Standard, the ISO/IEC 14496-10-MPEG-4 Part 10, Advanced Video Coding Standard, or the JCT-VC HEVC specification. In one or more implementations, the decoder may be the decoding device illustrated in FIG. 2 below and the decoder may operate in accordance with the decoder described below with respect to FIG. 6.

The server 110 may include, or may be coupled to, one or more processing devices 112 and/or a data store 114. The one or more processing devices 112 execute computer instructions stored in the data store 114, for example, to implement a video coding system. The data store 114 may store the computer instructions on a non-transitory computer-readable medium. In one or more implementations, the server 110 may be a single computing device such as a computer server. Alternatively, the server 110 may represent multiple computing devices that are working together to perform the actions of a server computer (such as a cloud of computers and/or a distributed system). The server 110 may be coupled with various databases, storage services, or other computing devices, that may be collocated with the server 110 or may be disparately located from the server 110.

In one or more implementations, the server 110 may be communicatively coupled to an antenna 116. The antenna 116 may be capable of transmitting wireless transmissions, such as video stream transmissions. The server 110 may also be communicatively coupled with a satellite dish capable of communicating a data stream to a satellite, such as a video data stream, which may be relayed by the satellite to one or more of the electronic devices 102, 103, 104, 106.

The server 110 may include, or may be coupled to a device that includes, an encoder, such as a video encoder. The encoder may operate in accordance with one or more video coding standards or specifications, such as the ITU-T H.264 Standard, the ISO/IEC 14496-10-MPEG-4 Part 10, Advanced Video Coding Standard, or the JCT-VC HEVC specification. In one or more implementations, the encoder may be the encoding device illustrated in FIG. 2 below and the encoder may operate in accordance with the encoder described below with respect to FIG. 5.

In operation, the server 110 may encode a video sequence, such as the video sequence illustrated in FIG. 3 below, into a coded video sequence, such as the coded video sequence illustrated in FIG. 4 below. The server 110 may encode the video sequence in real-time, or in non real-time. The server 110 may then transmit the coded video sequence to one or more of the electronic devices 102, 103, 104, 106, such as via the network 108, the antenna 116, a satellite relay transmission, or any other transmission system. The electronic devices 102, 103, 104, 106 may receive the coded video sequence transmission from the server 110, and may decode the coded video sequence, such as in real-time or in non real-time. The electronic devices 102, 103, 104, 106, may provide the decoded video sequence to users who are interacting with the electronic devices 102, 103, 104, 106, such as by presenting the decoded video sequences on a display.

The server 110 may encode pictures, or frames, of a video sequence by separating the pictures into one or more slices and encoding the one or more slices. The pictures of a video sequence, and the slices of the pictures, are discussed further below with respect to FIG. 3. During the process of encoding the slices, the server 110 may store one or more sets of parameters that are used to decode the slices, such as weighted prediction parameters, in either headers of the slices or in overhead information, such as a parameter set, that can be referenced in the headers of the slices. For example, the server 110 may determine whether one or more sets of parameters that are used to decode the slices, such as weighted prediction parameters, are repeated across multiple slices of one or more pictures, e.g. are equivalent across multiple slices of one or more pictures, such as by pre-processing the slices. In one or more implementations, if the server 110 is encoding the video sequence using a scalable video codec, such as the H.264/MPEG-4 AVC codec, the server 110 may also determine whether one or more sets of parameters that are used to decode the slices, such as weighted prediction parameters, are repeated across multiple slices of multiple layers for one or more pictures, e.g. slices of the base layer for the picture, and slices of one or more enhancement layers for the picture.

If the server 110 determines that a set of parameters is repeated across multiple slices of one or more pictures, or that there is a high likelihood that a set of parameters will be repeated across multiple slices of one or more pictures, the server 110 may determine the set of parameters having the highest commonality among the slices, e.g. the weighted prediction parameters that are the same for the largest number of slices. The server 110 may store the set of parameters having the highest commonality in overhead information, such as a parameter set, that can be referenced by a slice. In one or more implementations, if the server 110 did not pre-process the slices, the server 110 may store a set of parameters corresponding to the first processed slice in the overhead information, such as in a parameter set. The server 110 may then process any slices that utilize the set of parameters, and the server 110 may store an indication in the header of any such slice that indicates whether the set of parameters for decoding the slice are stored in the header of the slice or in the overhead information. The process of encoding a video sequence that includes sets of parameters stored in either headers of slices or in overhead information is discussed further below with respect to FIG. 5.

A decoding device, such as one of electronic devices 102, 103, 104, 106 may decode the slices and determine, based on the headers of the slices, whether a set of parameters for decoding the slice, such as a set of weighted prediction parameters, are stored in the header of the slice or in overhead information, such as a parameter set. The process of decoding a coded video sequence that includes sets of parameters stored in either headers of slices or in overhead information is discussed further below with respect to FIG. 6.

Thus, the subject video coding system may improve video coding efficiency by reducing the size of the headers of one or more slices by storing one or more sets of parameters, such as weighted prediction parameters, in overhead information, such as a parameter set, rather than in the headers of the one or more slices. The subject video coding system is generally described herein with reference to storing weighted prediction parameters for decoding one or more slices in a parameter set rather than in the headers of the slices. However, the subject video coding system may be used to store any sets of parameters, or any other information that may be redundant across multiple slices of one or more pictures and/or one or more layers, in overhead information rather than storing the redundant information in the headers of the slices.

Figure 2:
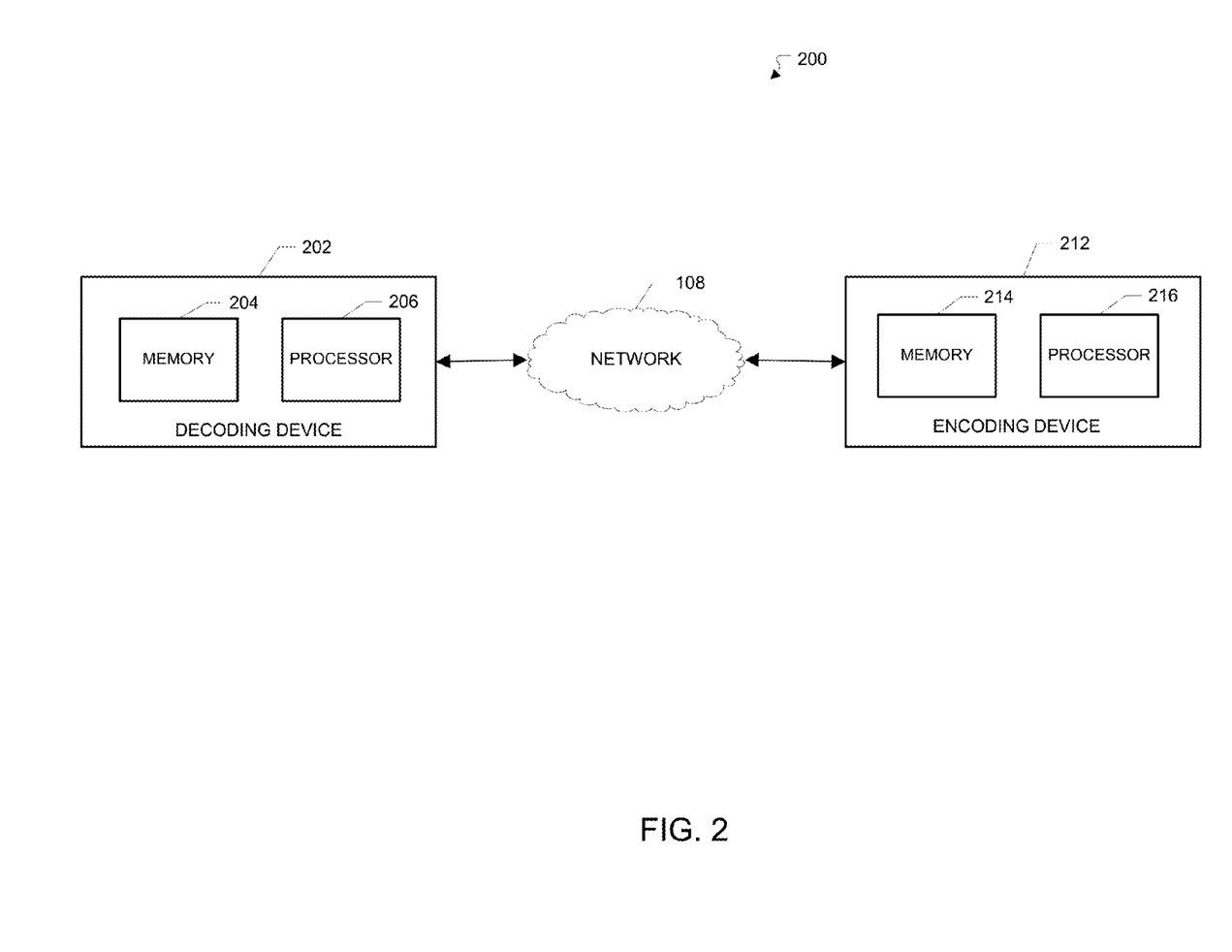
FIG. 2 illustrates an example network environment in which a video coding system may be implemented in accordance with one or more implementations.

FIG. 2 illustrates an example network environment 200 in which a video coding system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 200 includes a network 108, a decoding device 202, and an encoding device 212. The decoding device 202 may include a memory 204 and a processor 206, and the encoding device 212 may include a memory 214 and a processor 216. In operation, the processor 216 of the encoding device 212 may execute computer instructions that are stored in the memory 214, such as to encode a video sequence. For example, the processor 216 of the encoding device 212 may execute a process to encode a video sequence, such as the process described below with respect to FIG. 5.

The encoding device 212 may then transmit the coded video sequence to the decoding device 202, such as over the network 108. The processor 206 of the decoding device 202 may execute computer instructions that are stored in the memory 204, such as to decode the received coded video sequence. For example, the processor 206 of the decoding device 202 may execute a process to decode the coded video sequence, such as the process described below with respect to FIG. 6.

Figure 3:
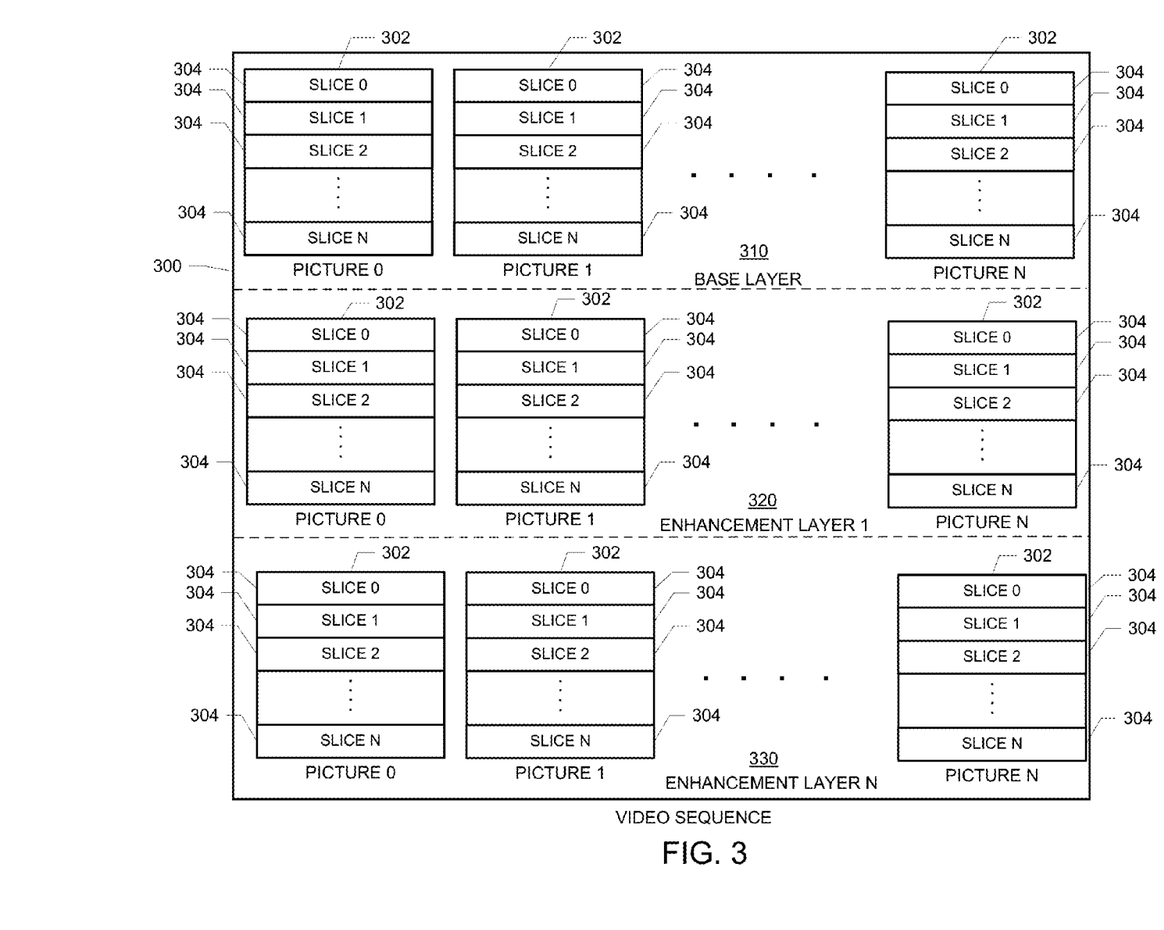
FIG. 3 illustrates an example video sequence of a video coding system in accordance with one or more implementations.

FIG. 3 illustrates an example video sequence 300 of a video coding system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The video sequence 300 may include a base layer 310 and one or more enhancement layers 320 and 330. In one or more implementations that do not utilize scalable video coding, the video sequence 300 may not include the one or more enhancement layers 320 and 330. The layers 310, 320 and 330 may include one or more pictures 302. The pictures 302 may represent a frame, or a field of a frame, e.g. the top field or the bottom field. An encoding device, such as the encoding device 212 of FIG. 2, may divide the pictures 302 into one or more slices 304, where a slice 304 includes a sequence of one or more macroblocks of the picture 302. Although the pictures 302 are depicted in FIG. 3 as being evenly divided into the slices 304, in one or more implementations a slice 304 may include any sized sequence of macroblocks, and a slice 304 may not span horizontally and/or vertically completely across a given picture 302.

Figure 4:
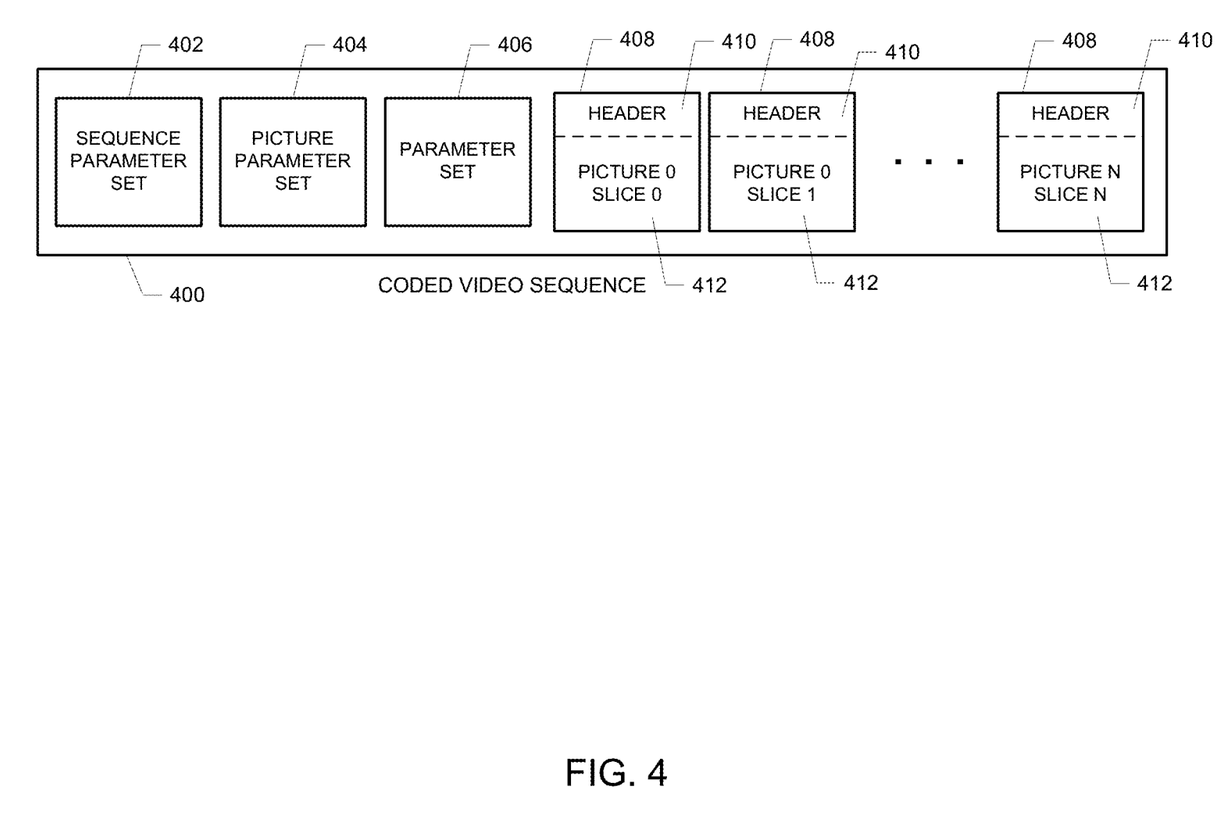
FIG. 4 illustrates an example coded video sequence of a video coding system in accordance with one or more implementations.

The encoding device 212 may encode the video sequence 300 to generate a coded video sequence, such as the coded video sequence illustrated in FIG. 4. For example, a slice 304 may be encoded as an "I" slice, a "P" slice, or a "B" slice. A slice 304 that is encoded as an I slice may be a slice 304 in which all of the macroblocks of the slice 304 are coded using intra prediction. A slice 304 that is encoded as a P slice may be a slice 304 in which the macroblocks of the slice 304 may be coded using intra prediction or inter prediction with at most one motion-compensated prediction signal per prediction block. A slice 304 that is encoded as a B slice may be a slice 304 in which the macroblocks may be coded using intra prediction or inter prediction with two motion-compensated prediction signals per prediction block.

The encoding device 212 may utilize weighted prediction to improve coding efficiency during illumination changes, such as fading transitions. In motion compensated prediction, for a prediction a reference is selected from one or more of the available reference lists, such as list 0 for the slices 304 that are encoded as P or B slices, or list 1 for the slices 304 that are encoded as B slices. The encoding device 212 may use these references to generate a prediction block for one or more of the lists. The encoding device 212 may further process the prediction blocks depending upon the availability of the weighted prediction. In the subject video coding system, the encoding device 212 may store the parameters corresponding to weighted prediction, such as a set of weighted prediction parameters, in the header of the slice 304, or in one of the parameter sets.

FIG. 4 illustrates an example coded video sequence 400 of a video coding system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The coded video sequence 400 may include a sequence parameter set 402, a picture parameter set 404, a parameter set 406, and one or more coded slices 408. The one or more coded slices 408 may include headers 410 and payloads 412. The coded slices 408 may be encapsulated in one or more Network Abstraction Layer (NAL) units.

The sequence parameter set 402 may be a set of parameters that applies to a series of consecutive coded video pictures, such as across the entire coded video sequence 400. For example, the sequence parameter set 402 may include information that is shared across the entire coded video sequence 400. In one or more implementations, the sequence parameter set 402 may include an indication that a set of parameters, such as weighted prediction parameters, for decoding one or more of the coded slices 408 of one or more of the layers 310, 320 and 330 is stored in either overhead information or in the headers 410 of the coded slices 408, or that the set of parameters is exclusively stored in the headers 410 of the coded slices 408.

In one or more implementations, the sequence parameter set 402 may generally correspond to Table 1, where the weighted_pred_table_in_ps_enabled_flag indicates whether a set of parameters, such as weighted prediction parameters, for decoding one or more coded slices 408 is stored in either overhead information or in the headers 410 of the coded slices 408, or that the set of parameters is exclusively stored in the headers 410 of the coded slices 408.

TABLE 1

Sequence Parameter Set

| seq_parameter_set_rbsp( ) { | Descriptor |
|---|---|
| profile_idc | u(8) |
| reserved_zero_8bits | u(8) |
| level_idc | u(8) |
| seq_parameter_set_id | ue(v) |
| chroma_format_idc | ue(v) |
| if( chroma_format_idc = = 3 ) | |
|     separate_colour_plane_flag | u(1) |
| max_temporal_layers_minus1 | u(3) |
| scaling_list_enable_flag | |
| weighted_pred_table_in_ps_enabled_flag | u(1) |
| deblocking_filter_in_ps_enabled_flag | u(1) |

The picture parameter set 404 may include parameters that can be referred to by coded slices 408 of one or more coded pictures. Thus, the coded video sequence 400 may include multiple picture parameter sets 404. In one or more implementations, the picture parameter set 404 may include one or more parameter sets, such as a set of weighted prediction parameters, that correspond to one or more coded slices 408. In another instance, the picture parameter set 404 may include an indication that the weighted prediction parameters for decoding one or more coded slices 408 are stored in either overhead information or in the headers 410 of the coded slices 408, or that the weighted prediction parameters are exclusively stored in the headers 410 of the coded slices 408.

In one or more implementations, the picture parameter set 404 may generally correspond to Table 2 where the weighted_pred_table_in_ps_enabled_flag indicates whether the weighted prediction parameters for decoding one or more coded slices 408 are stored in either overhead information or in the headers 410 of the coded slices 408, or that the weighted prediction parameters are exclusively stored in the headers 410 of the coded slices 408.

TABLE 2

Picture Parameter Set

| pic_parameter_set_rbsp( ) { | Descriptor |
|---|---|
| pic_parameter_set_id | ue(v) |
| seq_parameter_set_id | ue(v) |
| sign_data_hiding_flag | u(1) |
| if( sign_data_hiding_flag ) | |
|     sign_hiding_threshold | u(4) |
| cabac_init_present_flag | u(1) |
| num_ref_idx_l0_default_active_minus1 | ue(v) |
| num_ref_idx_l1_default_active_minus1 | ue(v) |
| [Ed. (BB): not present in HM software ] | |
| pic_init_qp_minus26 | se(v) |
| constrained_intra_pred_flag | u(1) |
| slice_granularity | u(2) |
| diff_cu_qp_delta_depth | ue(v) |
| cb_qp_offset | se(v) |
| cr_qp_offset | se(v) |
| weighted_pred_flag | u(1) |
| weighted_bipred_idc | u(2) |
| If(weighted_pred_flag || weighted_bipred_idc) | |
|     weighted_pred_table_in_ps_enable_flag | u(1) |
| ..... | |
| } | |

The parameter set 406 may be overhead information that may also include sets of parameters, such as weighted prediction parameters, that can be referred to in the headers 410 of the coded slices 408 of one or more of the coded pictures. Thus, the coded video sequence 400 may also include multiple parameter sets 406. In one or more implementations, the parameter set 406 may generally correspond to Table 3, where the ps_weighted_pred_flag indicates whether any weighted prediction parameters are stored in the parameter set 406, and the ps_weighted_pred_table( ) references a weighted prediction table in the parameter set 406 that contains any such weighted prediction parameters.

TABLE 3

Parameter Set

| Ps_rbsp( ) { | Descriptor |
|---|---|
| ps_id | ue(v) |
| ........ | |
| ps_weighted_pred_flag | u(1) |
| if( ps_weighted_pred_flag ) | |
|     weighted_pred_table( ) | |
| ............ | |
| rbsp_trailing_bits( ) | |
| } | |

In one or more implementations, a set of weighted prediction parameters, such as a weighted prediction parameter table, may generally correspond to Table 4, where the chroma_format_idc may specify the chroma sampling relative to the luma sampling, num_ref_idx_l0_active may specify the number of reference pictures for reference picture list 0 that may be used to decode a coded slice 408, and num_ref_idx_l1_active may specify the number of reference pictures for reference picture list 1 that may be used to decode a coded slice 408.

TABLE 4

Weighted Prediction Parameters

| weighted_pred_table( ) { | Descriptor |
|---|---|
| luma_log2_weight_denom | ue(v) |
| chroma_format_idc | |
| if( chroma_format_idc != 0 ) | |
|     delta_chroma_log2_weight_denom | se(v) |
| num_ref_idx_l0_active | ue(v) |
| if(num_ref_idx_l0_active >0) { | |
|     for( i = 0; i < num_ref_idx_l0_active; i++ ) { | |
|         luma_weight_l0_flag | u(1) |
|         if( luma_weight_l0_flag ) { | |
|             delta_luma_weight_l0[ i ] | se(v) |
|             luma_offset_l0[ i ] | se(v) |
|         } | |
|         if( chroma_format_idc != 0 ) { | |
|             chroma_weight_l0_flag | u(1) |
|             if( chroma_weight_l0_flag ) | |
|                 for( j =0; j < 2; j++ ) { | |
|                     delta_chroma_weight_l0[ i ][ j ] | se(v) |
|                     delta_chroma_offset_l0[ i ][ j ] | se(v) |
|                 } | |
|         } | |
|     } | |
| } | |
| num_ref_idx_l1_active | ue(v) |
| if(num_ref_idx_l1_active > 0) { | |
|     for( i = 0; i < num_ref_idx_l1_active; i++ ) { | |
|         luma_weight_l1_flag | u(1) |
|         if( luma_weight_l1_flag ) { | |
|             delta_luma_weight_l1[ i ] | se(v) |
|             luma_offset_l1[ i ] | se(v) |
|         } | |

TABLE 4-continued

Weighted Prediction Parameters

| weighted_pred_table( ) { | Descriptor |
|---|---|
|     if( chroma_format_idc != 0 ) { | |
|       chroma_weight_l1_flag | u(1) |
|       if( chroma_weight_l1_flag ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|       } | |
|     } | |
|   } | |
| } | |

The payloads 412 of the coded slices 408 may include coded picture data for one or more macroblocks of a coded picture of the coded video sequence 400. The header 410 of a coded slice 408 may include parameters for decoding the payload 412 of the coded slice 408. The header 410 of a coded slice 408 may further include an indication of whether the weighted prediction parameters for decoding the payload 412 of the coded slice 408 are stored in the header 410 of the coded slice 408 or in a parameter set that is referenced in the header 410 of the coded slice 408, such as the parameter set 406.

In one or more implementations, if the weighted prediction parameters are stored in the header 410 of a coded slice 408, the weighted prediction parameters may also generally correspond to Table 4 above. However, the weighted prediction parameters stored in the header 410 of the coded slice 408 may not include chroma_format_idc, num_ref_idx_l0_active, and/or num_ref_idx_l1_active, as these values may already be stored in another portion of the header 410 of the coded slice 408.

In one or more implementations, the header 410 of a coded slice 408 may generally correspond to Table 5, where the weighted_pred_table_in_ps_enabled_flag indicates whether any weighted prediction parameters are stored in overhead information, such as a parameter set 406, and the inherit_weighted_pred_params_from_ps_flag may indicate whether the coded slice 408 should be decoded using weighted prediction parameters stored in the header 410 of the coded slice 408, or using weighted prediction parameters stored in overhead information, such as a parameter set 406. In one or more implementations, the pred_weight_table( ) may reference a weighted prediction table stored in the header 410 of the coded slice 408, and the ps_id may be an identifier of a parameter set 406 that may include a weighted prediction table.

TABLE 5

Slice Header

| slice_header( ) { | Descriptor |
|---|---|
|   first_slice_in_pic_flag | u(1) |
|   if( first_slice_in_pic_flag == 0 ) | |
|     slice_address | u(v) |
|   slice_type | ue(v) |
|   if( sample_adaptive_offset_enabled_flag ) { | |
|     slice_sao_interleaving_flag | u(1) |
|     slice_sample_adaptive_offset_flag | u(1) |
|     if( slice_sao_interleaving_flag && | |
|       slice_sample_adaptive_offset_flag ) { | |
|       sao_cb_enable_flag | u(1) |
|       sao_cr_enable_flag | u(1) |

TABLE 5-continued

Slice Header

| slice_header( ) { | Descriptor |
|---|---|
|     } | |
|   } | |
|   if( scaling_list_enable_flag \|\| | |
|     deblocking_filter_in_ps_enabled_flag \|\| | |
|     adaptive_loop_filter_enabled_flag \|\| | |
|     ((( weighted_pred_flag && slice_type == P) \|\| | |
|     ( weighted_bipred_idc == 1 && slice_type == B )) && | |
|     weighted_pred_table_in_ps_enabled_flag) ) | |
|     ps_id | ue(v) |
| } | |
| if( cabac_init_present_flag && slice_type != I ) | |
|   cabac_init_flag | u(1) |
| if( !entropy_slice_flag ) { | |
|   slice_qp_delta | se(v) |
|   if( deblocking_filter_control_present_flag ) { | |
|     if( deblocking_filter_in_ps_enabled_flag ) | |
|       inherit_dbl_params_from_ps_flag | u(1) |
|     if( !inherit_dbl_params_from_ps_flag ) { | |
|       disable_deblocking_filter_flag | u(1) |
|       if( !disable_deblocking_filter_flag ) { | |
|         beta_offset_div2 | se(v) |
|         tc_offset_div2 | se(v) |
|       } | |
|     } | |
|   } | |
|   ....... | |
|   if( ( weighted_pred_flag && slice_type == P) \|\| | |
|     ( weighted_bipred_idc == 1 && slice_type == B ) ){ | |
|     if( weighted_pred_table_in_ps_enabled_flag ) | |
|       inherit_weighted_pred_params_from_ps_flag | u(1) |
|     if( !inherit_weighted_pred_params_from_ps_flag ) { | |
|       pred_weight_table( ) | |
|     } | |
|     } | |
|   } | |
| } | |

In one or more implementations, the indication that the weighted prediction parameters for decoding one or more coded slices 408 may be stored in either a parameter set corresponding to the slices, such as the parameter set 406, or in the headers 410 of the coded slices 408 may be stored in the picture parameter set 404, as the weighted_pred_table_in_ps_enable_flag value, as shown above in Table 2. In these one or more implementations, the header 410 of a coded slice 408 may generally correspond to Table 6.

TABLE 6

Alternative Slice Header

| slice_header( ) { | Descriptor |
|---|---|
|   first_slice_in_pic_flag | u(1) |
|   if( first_slice_in_pic_flag == 0 ) | |
|     slice_address | u(v) |
|   slice_type | ue(v) |
|   if( sample_adaptive_offset_enabled_flag ) { | |
|     slice_sao_interleaving_flag | u(1) |
|     slice_sample_adaptive_offset_flag | u(1) |
|     if( slice_sao_interleaving_flag && | |
|       slice_sample_adaptive_offset_flag ) { | |
|       sao_cb_enable_flag | u(1) |
|       sao_cr_enable_flag | u(1) |
|     } | |
|   } | |
|   if( scaling_list_enable_flag \|\| | |
|     deblocking_fitter_in_ps_enabled_flag \|\| | |

TABLE 6-continued

Alternative Slice Header

| slice_header( ) { | Descriptor |
|---|---|
|     adaptive_loop_fitter_enabled_flag \|\| | |
|     weighted_pred_table_in_ps_enabled_flag ) | |
|     ps_id | ue(v) |
| } | |
| if( cabac_init_present_flag && slice_type != I ) | |
|   cabac_init_flag | u(1) |
| if( !entropy_slice_flag ) { | |
|   slice_qp_delta | se(v) |
|   if( deblocking_filter_control_present_flag ) { | |
|     if( deblocking_filter_in_ps_enabled_flag ) | |
|       inherit_dbl_params_from_ps_flag | u(1) |
|     if( !inherit_dbl_params_from_ps_flag ) { | |
|       disable_deblocking_filter_flag | u(1) |
|       if( !disable_deblocking_filter_flag ) { | |
|         beta_offset_div2 | se(v) |
|         tc_offset_div2 | se(v) |
|       } | |
|     } | |
|   } | |
|   ....... | |
|   if( ( weighted_pred_flag && slice_type = = P) \|\| | |
|     ( weighted_bipred_idc = = 1 && slice_type = = B ) ){ | |
|     if( weighted_pred_table_in_ps_enabled_flag ) | |
|       inherit_weighted_pred_params_from_ps_flag | u(1) |
|     if( !inherit_weighted_pred_params_from_ps_flag ) { | |
|       pred_weight_table( ) | |
|     } | |
|   } | |
| } | |
| } | |

In one or more implementations, when a parameter set 406 stores weighted prediction parameters that are different than the weighted prediction parameters for decoding any coded slice 408, the weighted prediction parameters for decoding the coded slice 408 may be predicted based on the weighted prediction parameters stored in the parameter set 406. The predicted weighted prediction parameters may then be stored in the header 410 of the coded slice 408, along with an indication that the weighted prediction parameters stored in the header 410 were predicted from the weighted prediction parameters stored in the parameter set 406. In one or more implementations, the weighted prediction parameters stored in one parameter set 406 may be predicted based on the weighted prediction parameters stored in a previous parameter set. In these one or more implementations, the parameter set 406 may include an indication that the weighted prediction parameters stored in the parameter set 406 were predicted from weighted prediction parameters stored in the previous parameter set 406.

Figure 5:
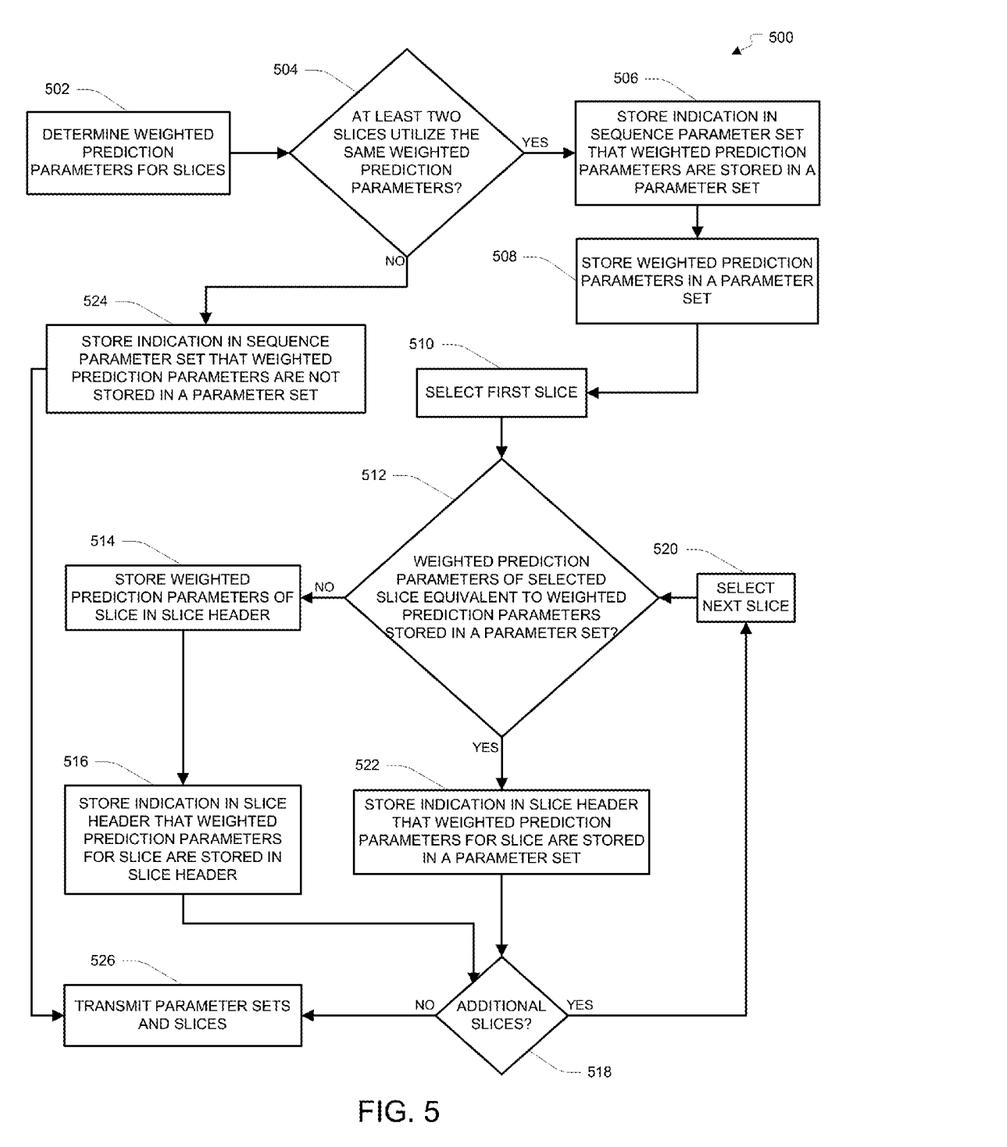
FIG. 5 illustrates a flow diagram of an example process for an encoder in a video coding system in accordance with one or more implementations.

FIG. 5 illustrates a flow diagram of an example process 500 for an encoder in a video coding system in accordance with one or more implementations. For explanatory purposes, example process 500 is described herein with reference to the example network environments 100, 200 of FIGS. 1 and 2, the example video sequence 300 of FIG. 3, and the example coded video sequence 400 of FIG. 4. However, example process 500 is not limited to the example network environments 100, 200 of FIGS. 1 and 2, the example video sequence 300 of FIG. 3, or the example coded video sequence 400 of FIG. 4. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

An encoding device, such as the encoding device 212, determines weighted prediction parameters for one or more coded slices 408 of a picture that are encoded using weighted prediction (502), such as B slices and P slices. In one or more implementations, the encoding device 212 may skip one or more steps (502-522) of example process 500 for any coded slices 408 that are not B slices or P slices. The encoding device 212 determines whether at least two coded slices 408 utilize the same weighted prediction parameters (504). If the encoding device 212 determines that none of the coded slices 408 utilize the same weighted prediction parameters (504), the encoding device 212 stores an indication in the sequence parameter set 402 that indicates that no weighted prediction parameters are stored in the parameter set 406 (524). Alternatively, the encoding device 212 may store the indication in the picture parameter set 404. The encoding device 212 then completes the processing of the coded slices 408 and transmits the parameter sets 402, 404, 406 and coded slices 408 (526). In one or more implementations, the encoding device 212 may encapsulate the coded slices 408, such as in a NAL unit, before transmitting the coded slices 408 (526).

If the encoding device 212 determines that at least two coded slices 408 utilize the same weighted prediction parameters (504), the encoding device 212 stores an indication in the sequence parameter set 402 that indicates that weighted prediction parameters are stored in the parameter set 406 (506). In one or more implementations, the encoding device 212 may store the indication in the picture parameter set 404 rather than the sequence parameter set 402.

In one or more implementations, the encoding device 212 may not pre-process the coded slices 408, such as when the encoding device 212 is encoding in real-time. In these one or more implementations, the encoding device 212 may skip determining whether at least two slices utilize the same weighted prediction parameters (504), but the encoding device 212 may still store an indication in the sequence parameter set 402, or the picture parameter set 404, that indicates that weighted prediction parameters are stored in the parameter set 406 (506). In one or more implementations, the encoding device 212 may predict the weighted prediction parameters from one or more of the coded slices 408 based on the weighted prediction parameters stored in a parameter set 406. In these one or more implementations, the encoding device 212 may skip determining whether at least two slices utilize the same weighted prediction parameters (504), but the encoding device 212 may still store an indication in the sequence parameter set 402, or the picture parameter set 404, that indicates that weighted prediction parameters for decoding one or more coded slices 408 are stored in the parameter set 406 (506).

The encoding device 212 may store weighted prediction parameters for one or more coded slices 408 in the parameter set 406 (508), or in other overhead information. In one or more implementations, the encoding device 212 may store the weighted prediction parameters that have the highest commonality amongst the coded slices 408 in the parameter set 406 (508). In one or more implementations, the encoding device 212 may store the weighted prediction parameters of the first processed coded slice 408 in the parameter set 406 (508).

The encoding device 212 selects the first coded slice 408 to process (510), such as the first temporally occurring coded slice 408. The encoding device 212 determines whether the weighted prediction parameters of the selected coded slice 408 are equivalent to the weighted prediction parameters stored in the parameter set 406 (512). If the encoding device 212 determines that the weighted prediction parameters of the selected coded slice 408 are equivalent to the weighted prediction parameters stored in the parameter set 406 (512), the encoding device 212 stores an indication in the header 410 of the coded slice 408 that indicates that the weighted prediction parameters for decoding the coded slice 408 are stored in the parameter set 406 (522). The encoding device 212 may also store an identifier of the parameter set 406 in the header 410 of the coded slice 408.

If the encoding device 212 determines that the weighted prediction parameters of the selected coded slice 408 are not equivalent to the weighted prediction parameters stored in the parameter set 406 (512), the encoding device 212 stores the weighted prediction parameters for decoding the coded slice 408 in the header 410 of coded slice 408 (514). In one or more implementations, the encoding device 212 may predict the weighted prediction parameters for decoding coded slice 408 based on the weighted prediction parameters stored in the parameter set 406, and may store the weighted prediction parameters in the header 410 of the coded slice 408. In these one or more instances, the encoding device 212 also store an indication in the header 410 of the coded slice 408 that indicates that the weighted prediction parameters stored in the header 410 of the coded slice 408 were predicted from the weighted prediction parameters stored in the parameter set 406. The encoding device 212 stores an indication in the header 410 of the coded slice 408 that indicates that the weighted prediction parameters for decoding the coded slice 408 are stored in the header 410 (516).

The encoding device 212 determines whether there are any additional slices to be processed (518). If the encoding device 212 determines that there are additional slices to be processed (518), the encoding device 212 selects the next coded slice 408 to be processed (520) and repeats the process of storing the weighted prediction parameters (512-518) for the next coded slice 408. If the encoding device 212 determines that there are no additional coded slices 408 to be processed (518), the encoding device 212 completes the encoding of the coded slices 408 and transmits the parameter sets 402, 404, 406, and the coded slices 408, such as over network 108 to decoding device 202 (526).

Figure 6:
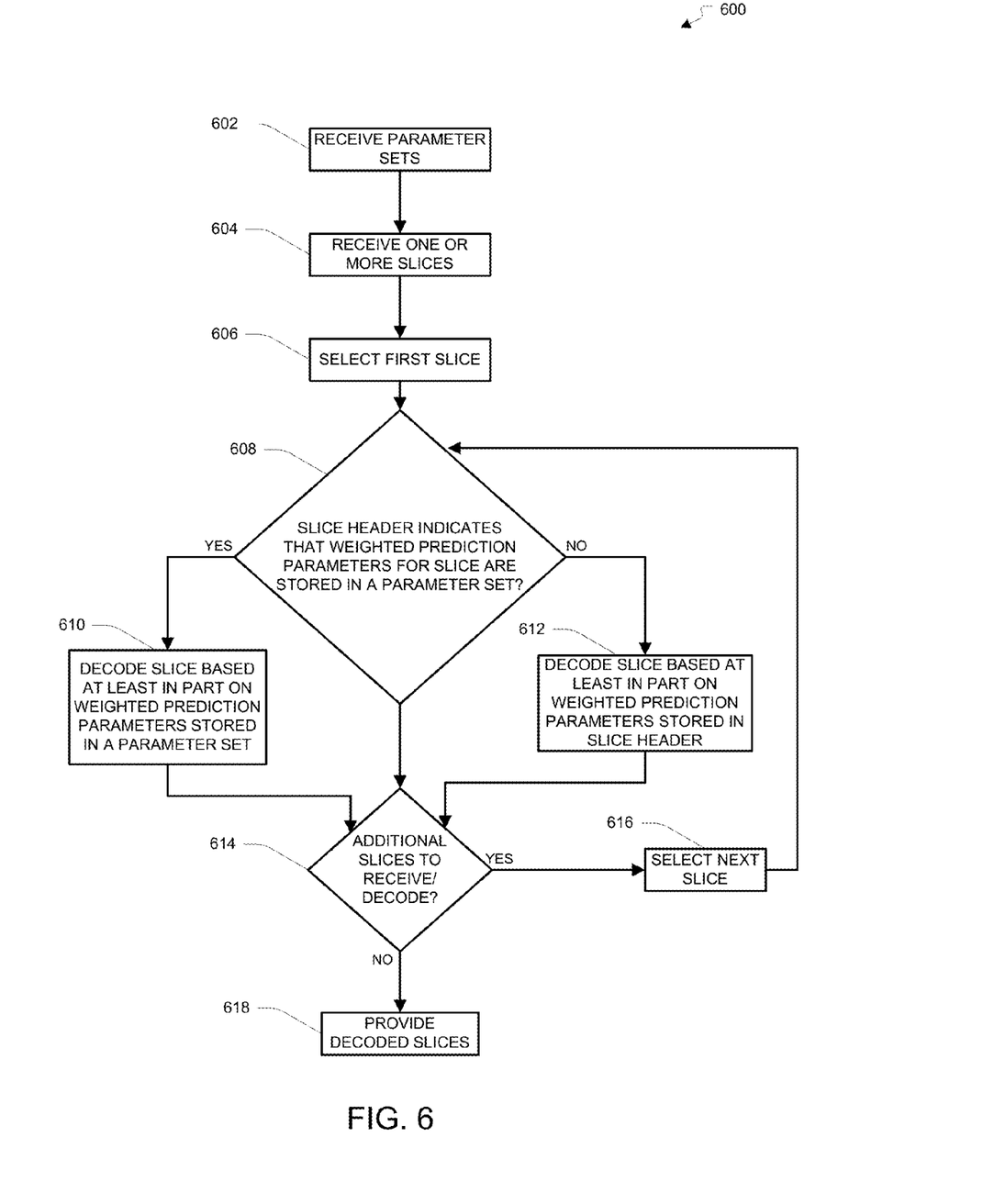
FIG. 6 illustrates a flow diagram of an example process for a decoder in a video coding system in accordance with one or more implementations.

FIG. 6 illustrates a flow diagram of an example process 600 for a decoder in a video coding system in accordance with one or more implementations. For explanatory purposes, example process 500 is described herein with reference to the example network environments 100, 200 of FIGS. 1 and 2, the example video sequence 300 of FIG. 3, and the example coded video sequence 400 of FIG. 4. However, example process 500 is not limited to the example network environments 100, 200 of FIGS. 1 and 2, the example video sequence 300 of FIG. 3, or the example coded video sequence 400 of FIG. 4. Further for explanatory purposes, the blocks of example process 600 are described herein as occurring in serial, or linearly. However, multiple blocks of example process 600 may occur in parallel. In addition, the blocks of example process 600 need not be performed in the order shown and/or one or more of the blocks of example process 600 need not be performed.

A decoding device, such as the decoding device 202 of FIG. 2, receives parameter sets for a coded video sequence 400 (602), such as a sequence parameter set 402, a picture parameter set 404, and a parameter set 406. The decoding device 202 receives one or more coded slices 408 (604). The decoding device 202 selects the first received coded slice 408 that was encoded using weighted prediction (606), such as a B slice or a P slice. In one or more implementations, the decoding device 202 may skip the process of decoding based on weighted prediction parameters (606-614) for any coded slices 408 that are not encoded as B slices or P slices. The decoding device 202 determines whether the header 410 of the selected coded slice 408 indicates that the weighted prediction parameters for decoding the coded slice 408 are stored in the parameter set 406 (608). For example, the header 410 of the selected coded slice 408 may reference an indication stored in the sequence parameter set 402, or in the picture parameter set 404, that indicates whether the weighted prediction parameters for decoding the selected coded slice 408 are stored in the parameter set 406.

If the decoding device 202 determines that the weighted prediction parameters for decoding the selected coded slice 408 are stored in the parameter set 406 (608), the decoding device 202 retrieves the weighted prediction parameters for decoding the selected coded slice 408 from the parameter set 406, and the decoding device 202 decodes the selected coded slice 408 based at least in part on the weighted prediction parameters stored in the parameter set 406 (610). If the decoding device 202 determines that the weighted prediction parameters for decoding the selected coded slice 408 are not stored in the parameter set 406 (608), the decoding device 202 decodes the selected coded slice 408 based at least in part on the weighted prediction parameters stored in the header 410 of the coded slice 408 (612).

In one or more implementations, the header 410 of the selected coded slice 408 may also include an indication that the weighted prediction parameters were predicted from the weighted prediction parameters stored in the parameter set 406. In these one or more implementations, the decoding device 202 may decode the selected coded slice 408 based at least in part on the weighted prediction parameters stored in the parameter set 406 and the weighted prediction parameters stored in the header 410 of the selected coded slice 408.

The decoding device 202 determines whether there are any additional coded slices 408 that utilize weighted prediction, such as B slices or P slices, that still need to be decoded, or are still being received (614). If the decoding device 202 determines that there are additional coded slices 408 that utilize weighted prediction that need to be decoded and/or received (614), the decoding device 202 selects the next coded slice 408 that utilizes weighted prediction that is to be decoded (616), and the decoding device 202 repeats the decoding process (608-614) for the selected coded slice 408.

If the decoding device 202 determines that there are no additional coded slices 408 that were encoded using weighted prediction that still need to be decoded and/or received (614), the decoding device 202 provides the decoded pictures of the decoded slices (618), such as by presenting the decoded pictures on a display. In one or more implementations, the decoding device 202 may provide the decoded pictures as soon as they are decoded, such as when the coded video sequence 400 is being decoded in real-time.

Figure 7:
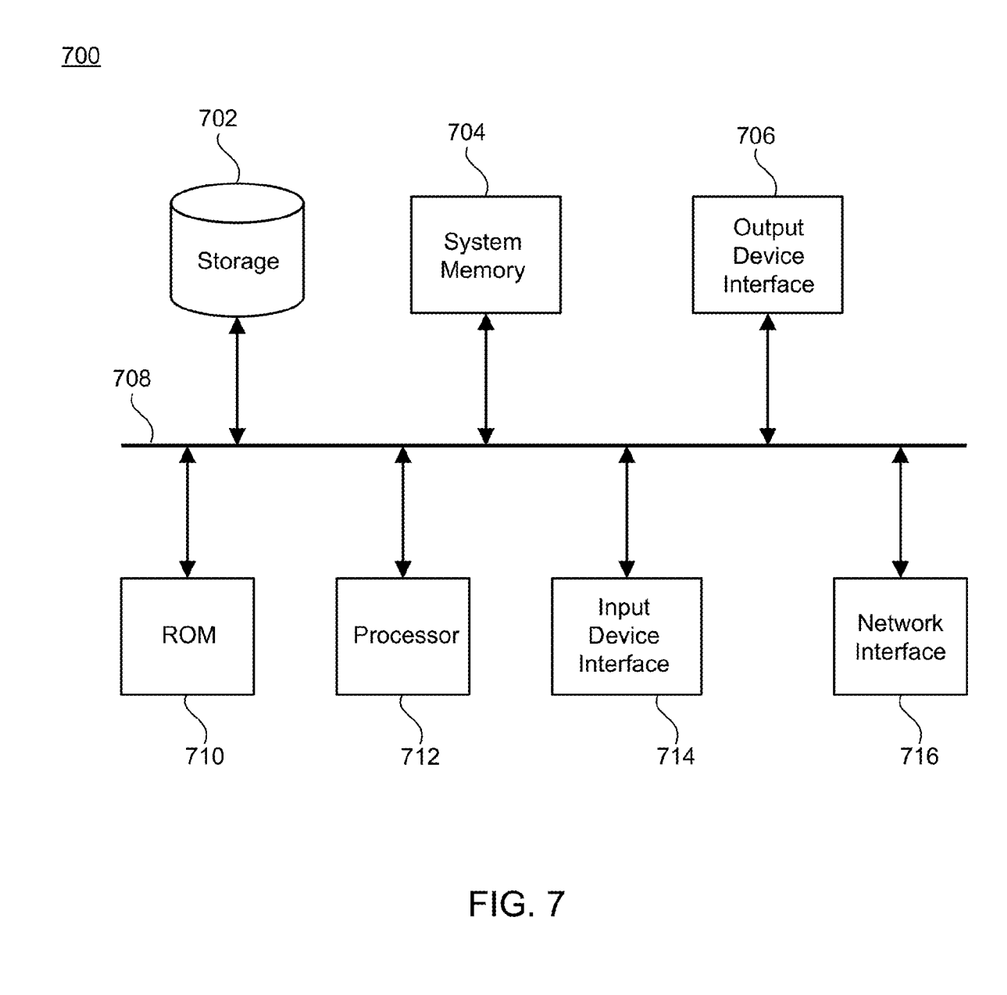
FIG. 7 conceptually illustrates electronic system with which any implementations of the subject technology are implemented.

FIG. 7 conceptually illustrates an electronic system 700 with which any implementations of the subject technology are implemented. The electronic system 700, for example, can be a desktop computer, a laptop computer, a tablet computer, a server, a switch, a router, a base station, a receiver, a phone, a personal digital assistant (PDA), or generally any electronic device that transmits signals over a network, such as the electronic devices 102, 103, 104, 106, the decoding device 202, or encoding device 212. Such an electronic system includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, and a network interface 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system. The permanent storage device 702, on the other hand, is a read-and-write memory device. The permanent storage device 702 is a non-volatile memory unit that stores instructions and data even when the electronic system 700 is off. One or more implementations of the subject disclosure use a mass-storage device (such as a magnetic or optical disk and its corresponding disk drive) as the permanent storage device 702.

Other implementations use a removable storage device (such as a floppy disk, flash drive, and its corresponding disk drive) as the permanent storage device 702. Like the permanent storage device 702, the system memory 704 is a read-and-write memory device. However, unlike the permanent storage device 702, the system memory 704 is a volatile read-and-write memory, such as random access memory. System memory 704 stores any of the instructions and data that the one or more processing unit(s) 712 needs at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input device interface 714 and the output device interface 706. The input device interface 714 enables a user to communicate information and select commands to the electronic system. Input devices used with the input device interface 714 include, for example, alphanumeric keyboards and pointing devices (also called "cursor control devices"). The output device interface 706 enables, for example, the display of images generated by the electronic system 700. Output devices used with the output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of the electronic system 700 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for coding a video sequence, the method comprising:
   determining a plurality of slices corresponding to at least one picture of a video sequence, wherein each of the plurality of slices comprises a slice header;
   determining a first set of parameters common to a first number of the plurality of slices, a second set of parameters common to a second number of the plurality of slices and a third set of parameters common to a third number of slices of the plurality of slices;
   determining one set of parameters of the first, second, and third set of parameters having a highest commonality among a largest number of the plurality of slices, wherein the largest number of the plurality of slices is less than all of the plurality of slices;
   storing, in overhead information that corresponds to the plurality of slices, only the one set of parameters having the determined highest commonality;
   determining, for each of the plurality of slices, whether each set of parameters of each of the plurality of slices is equivalent to the one set of parameters stored in the overhead information;
   storing, for each of the plurality of slices, a first indication in the slice header of each of the plurality of slices that indicates that the one set of parameters stored in the overhead information applies to each of the plurality of slices if each set of parameters of each of the plurality of slices is equivalent to the one set of parameters stored in the overhead information, otherwise storing, in the slice header of each of the plurality of slices, each set of parameters of each of the plurality of slices; and
   transmitting the overhead information and the plurality of slices.

2. The method of claim 1, wherein the overhead information comprises a first parameter set.

3. The method of claim 2, wherein the first, second, and third sets of parameters comprise first, second, and third sets of weighted prediction parameters, respectively.

4. The method of claim 3, wherein one of the first, second, or third sets of weighted parameters of one of the plurality of slices comprises at least one of a first parameter that indicates a chroma sampling rate relative to a luma sampling rate or a second parameter that indicates a number of reference pictures for a picture list that are used to decode the one of the plurality of slices.

5. The method of claim 4, further comprising storing, in a second parameter set that corresponds to the plurality of slices, a second indication that indicates that the first, second, and third sets of weighted prediction parameters of the plurality of slices are stored in either the slice headers of the plurality of slices or the first parameter set.

6. The method of claim 5, wherein the second parameter set comprises at least one of a picture parameter set or a sequence parameter set.

7. The method of claim 1, wherein the at least one picture comprises a base layer picture and a temporally collocated enhancement layer picture.

8. The method of claim 1, wherein the storing, for each of the plurality of slices, the first indication in the slice header of each of the plurality of slices that indicates that the one set of parameters stored in the overhead information applies to each of the plurality of slices further comprises storing, for each of the plurality of slices, an identifier of the overhead information in the slice header.

9. A non-transitory machine-readable medium embodying instructions that, when executed by a machine, allow the machine to perform a method for decoding a coded video sequence, the method comprising:
receiving overhead information of a coded video sequence that comprises a first set of parameters corresponding to a plurality of slices of at least one picture of the coded video sequence;
receiving the plurality of slices of the at least one picture of the coded video sequence, each of the plurality of slices comprising a slice header, wherein the slice header of each of the plurality of slices comprises an indication of whether the first set of parameters of the overhead information applies to each of the plurality of slices;
decoding each of the plurality of slices based at least in part on the first set of parameters when the indication of the slice header of each of the plurality of slices indicates that the first set of parameters of the overhead information applies to each of the plurality of slices, otherwise decoding each of the plurality of slices based at least in part on a respective second set of parameters that are stored in the slice header of each of the plurality of slices when the indication of the slice header of each of the plurality of slices indicates that the first set of parameters of the overhead information does not apply to each of the plurality of slices, the respective second sets of parameters stored in the slice header of each of the plurality of slices being common to at least two of the plurality of slices, the first set of parameters having been determined to be common to a largest number of the plurality of slices relative to the respective second sets of parameters, and the largest number of the plurality of slices being less than all of the plurality of slices; and
providing the decoded plurality of slices.

10. The non-transitory machine-readable medium of claim 9, wherein the first set of parameters comprises a set of weighted prediction parameters.

11. The non-transitory machine-readable medium of claim 10, wherein the set of weighted prediction parameters comprises a second parameter that indicates a number of reference pictures for a picture list that are used to decode the one of the plurality of slices.

12. The non-transitory machine-readable medium of claim 9, wherein the respective second sets of parameters each comprise a second indication that indicates that the first set of parameters is stored in the overhead information.

13. The non-transitory machine-readable medium of claim 12, wherein the respective second sets of parameters each comprise at least one of a picture parameter set or a sequence parameter set both of which are separate from the first set of parameters.

14. The non-transitory machine-readable medium of claim 9, wherein the at least one picture comprises a base layer picture and a temporally collocated enhancement layer picture.

15. A system for coding a video sequence, the system comprising:
one or more processors; and
a memory including instructions that, when executed by the one or more processors, cause the one or more processors to:
determine a plurality of different sets of weighted prediction parameters, each of which is associated with at least two of a plurality of slices corresponding to at least one picture of a video sequence, wherein each of the plurality of slices comprises a header;
determine one set of weighted prediction parameters of the plurality of different sets of weighted prediction parameters that is associated with a largest number of the plurality of slices relative to other sets of weighted prediction parameters of the plurality of different sets of weighted prediction parameters, wherein the one set of weighted prediction parameters is associated with less than all of the plurality of slices;
store, in a first parameter set corresponding to the plurality of slices, the one set of weighted prediction parameters of the plurality of different sets of weighted prediction parameters that corresponds to the largest number of the plurality of slices;
determine, for each remaining slice of the plurality of slices, whether each of the weighted prediction parameters of each remaining slice is equivalent to the one set of weighted prediction parameters;
store, for each remaining slice of the plurality of slices, an indication in the header of each remaining slice that indicates that the one set of weighted prediction parameters stored in the first parameter set corresponds to each remaining slice when each set of weighted prediction parameters of each remaining slice is equivalent to the one set of weighted prediction parameters, otherwise store, in the header of each remaining slice of the plurality of slices, each set of weighted prediction parameters corresponding to each remaining slice; and
transmit the first parameter set and the plurality of slices.

16. The system of claim 15, wherein one of the plurality of different sets of weighted prediction parameters of one of the plurality of slices comprises at least one of a first parameter that indicates chroma sampling relative to luma sampling or a second parameter that indicates a number of reference pictures for a picture list that are used to decode the one of the plurality of slices.

17. The system of claim 16, wherein the memory further includes instructions that, when executed by the one or more processors, cause the one or more processors to store, in a second parameter set that corresponds to the plurality of slices, a second indication that indicates that the sets of weighted prediction parameters of the plurality of slices are stored in either the headers of the plurality of slices or the first parameter set.

18. The system of claim 17, wherein the second parameter set comprises at least one of a picture parameter set or a sequence parameter set.

19. The system of claim 15, wherein the at least one picture comprises a base layer picture and a temporally collocated enhancement layer picture.

20. The method of claim 1, wherein one of the first, second, or third sets of parameters of one of the plurality of slices comprises a parameter that is indicative of both chroma sampling and luma sampling.

* * * * *